May 8, 1962 M. E. ANDERSON ETAL 3,033,423
VIBRATORY DETERGENT DISPENSER
Filed Oct. 3, 1958 3 Sheets-Sheet 1
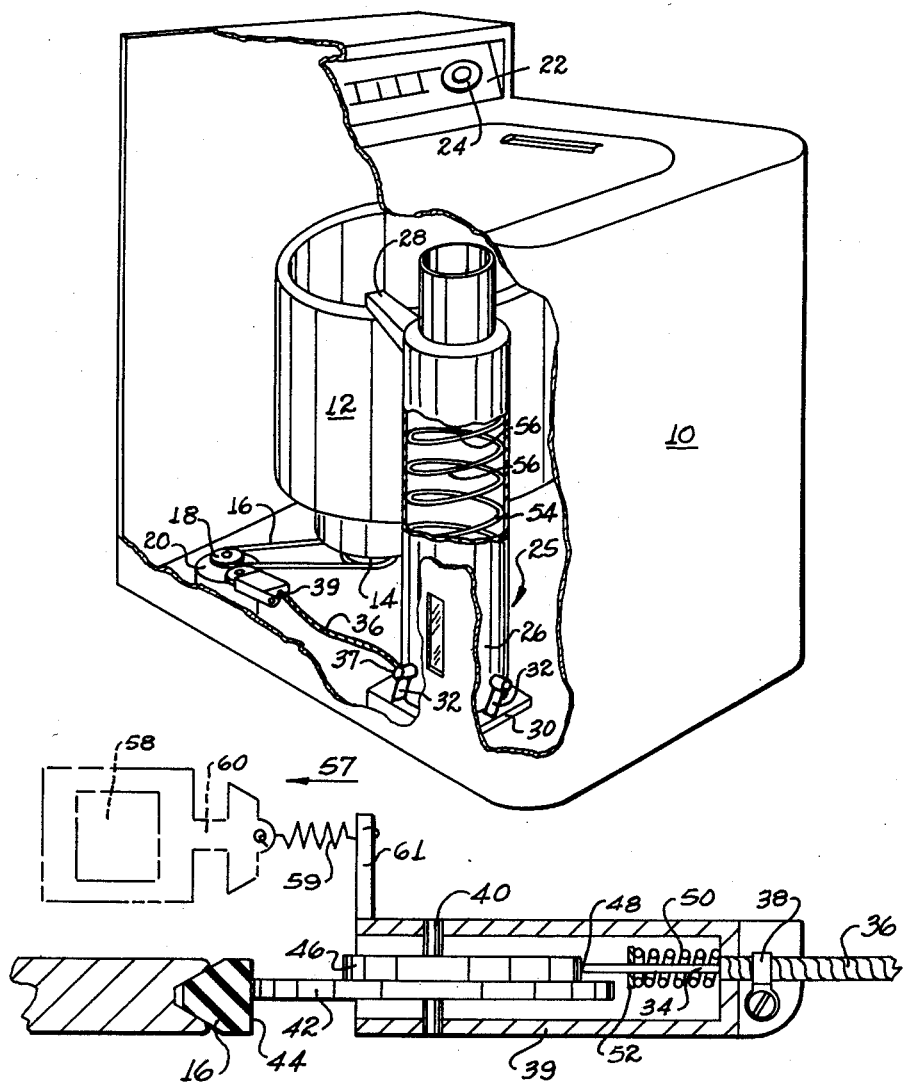
INVENTOR.
MAYNARD E. ANDERSON
FRANK F. FARRAN
BY JAMES H. DEERY
SMITH, WILSON, LEWIS & McRAE May 8, 1962  M. E. ANDERSON ETAL  3,033,423
VIBRATORY DETERGENT DISPENSER
Filed Oct. 3, 1958  3 Sheets-Sheet 2
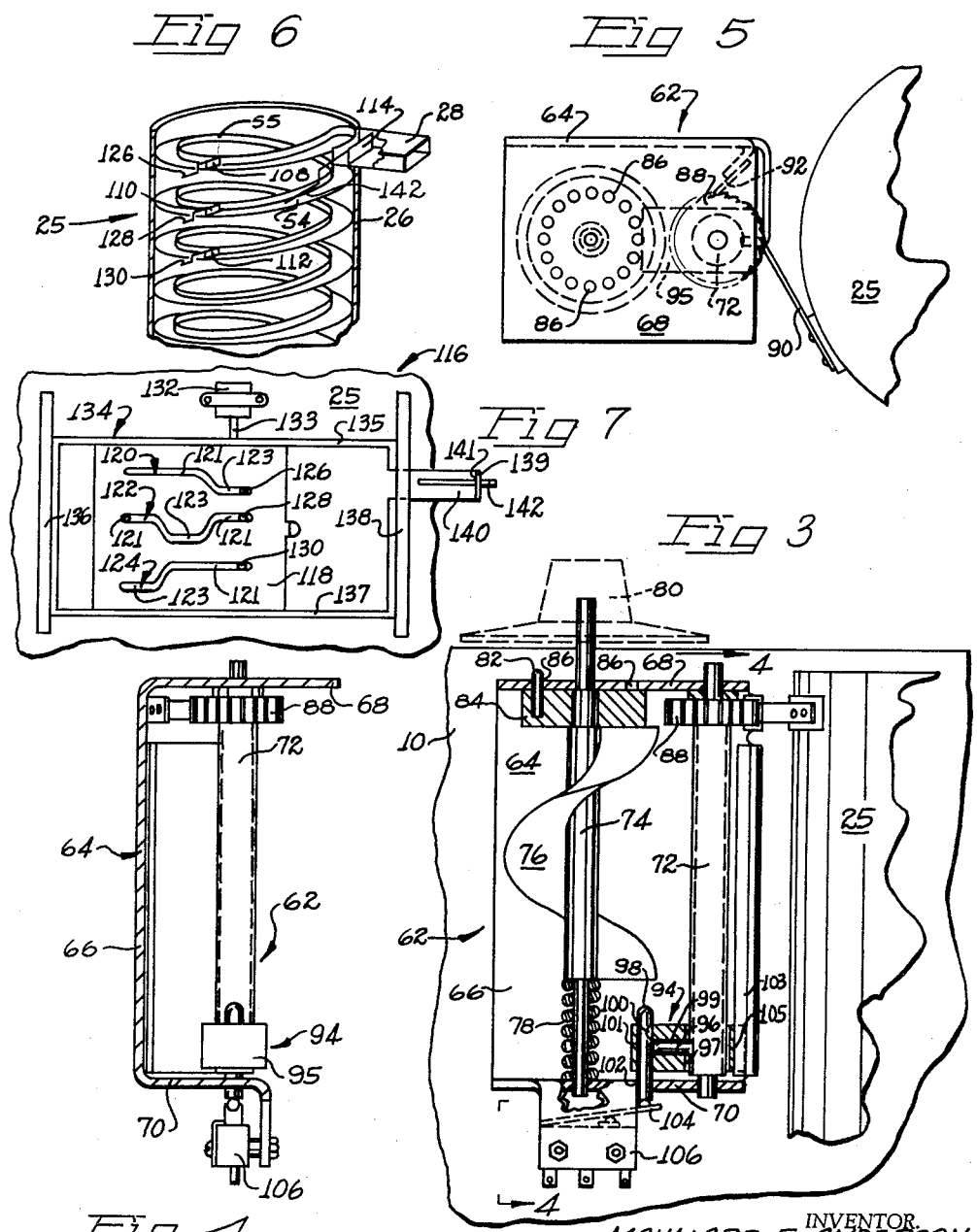
INVENTOR.
MAYNARD E. ANDERSON
FRANK F. FARRAN
BY JAMES H. DEERY
SMITH, WILSON, LEWIS & McRAE May 8, 1962 M. E. ANDERSON ETAL 3,033,423
VIBRATORY DETERGENT DISPENSER Filed Oct. 3, 1958 3 Sheets-Sheet 3

INVENTOR.
MAYNARD E. ANDERSON
FRANK F. FARRAN
BY JAMES H. DEERY

SMITH, WILSON, LEWIS & McRAE

United States Patent Office 3,033,423
Patented May 8, 1962

3,033,423
VIBRATORY DETERGENT DISPENSER
Maynard E. Anderson, Palo Alto, Frank F. Farran, Cupertino, and James H. Deery, Carmel Valley, Calif., assignors to American Radiator & Standard Sanitary Corporation, New York, N.Y., a corporation of Delaware
Filed Oct. 3, 1958, Ser. No. 765,225
6 Claims. (Cl. 222—161)

This invention relates to vibratory dispensers for dispensing granular materials such as detergents, soap powders, and powdered coffee. More particularly, the invention relates to small vibratory dispensers capable of storing granular material under substantially moisture-proof conditions, conveying the stored material from the storage area to the point of use, and metering the amount of material so dispensed.

Dispensing devices are useful in appliances, such as clothes or dishwashing machines and coffee vending machines, to dispense measured quantities of granular material necessary to the operation of such appliances. Desirable characteristics of such devices are that they store granular material under moisture-free conditions, protecting it from the liquid, usually water, used in the operation of such appliances. Another desirable characteristic of such dispensers is that they store and convey granular material in such a manner as to prevent caking or lumping. Such caking or lumping may be caused by mechanical handling of granular material, or by contacting the material with moisture, or by the usual settling of the material in a storage container. A further desirable property of dispensers is that they be capable of dispensing granular material in selectively predetermined amounts. For instance, in clothes-washing machines, variations in the type of soap used, the type of clothes being washed and the personal taste of the housewife using the appliance, require that a dispenser be capable of metering soap powder in various amounts such, for example, as one half cup increments.

It is, therefore, an object of this invention to provide an improved dispenser capable of storing granular or powdered substances under substantially moisture-free conditions, to convey the granular material to an outlet spout without causing caking thereof, and to dispense the material in controlled quantities preferably in timed sequence with the cycle of operation of the appliance with which the dispenser cooperates.

Another object of the invention is to provide a dispenser which operates by means of vibratory impulses and in which the vibrations aid in preventing lumping and caking of the granular material and also act to break up existing lumps.

A further object of the invention is to provide a dispenser having a storage bin which may be completely emptied by vibratory action before additional granular material need be added.

A further object is to provide a dispenser in which the storage bin and associated parts are substantially self-cleaning.

A still further object is to provide metering means for a vibratory dispenser which are capable of metering measured amounts of granular material as selectively determined by the appliance operator.

Another object of the invention is the provision of metering means which will measure the amount of granular material dispensed with sufficient accuracy for use in connection with commercial vending machines.

A still further object is to provide metering means which are not sensitive to the weight or texture of the various types of granular materials which may be dispensed therefrom.

Still a further object of the invention is to provide metering means which are simple in operation and construction and which will allow the granular material to be dispensed rapidly.

A further object is to provide a conveying system which does not involve separately moving parts, thus avoiding caking or glazing as a result of mechanical action on the granular material.

A still further object is the provision of a dispenser in which there is no separation of granular material according to particle size, whereby the material is dispensed substantially in its original state.

The invention embodied herein is related to copending applications, Serial No. 739,824, filed June 4, 1958, and Serial No. 765,998, filed October 8, 1958, both now abandoned, relating, respectively, to the mechanism for vibrating the dispenser, and to the mechanical construction of the device to provide a substantially moisture-proof construction.

Other objects of this invention will appear in the following description and appended claims, reference being had to the accompanying drawings forming a part of this specification wherein like reference characters designate corresponding parts in the several views.

In the drawings:

FIG. 1 is a perspective view, partly in section, illustrating the application of our invention to a washing machine.

FIG. 2 is a fragmentary sectional view illustrating a portion of the vibratory drive mechanism of FIG. 1;

FIG. 3 is a sectional view of a control mechanism cooperating with the dispenser of FIG. 1 to provide metering means therefor;

FIG. 4 is a sectional view taken substantially along the line 4—4 of FIG. 3 looking in the direction of the arrows;

FIG. 5 is a top plan view of the mechanism shown in FIG. 3;

FIG. 6 is a perspective view, partly in section, of a second embodiment of metering means for the dispenser of FIG. 1;

FIG. 7 is a front elevational view of solenoid actuating means to operate the metering means of FIG. 6;

Figure 8:
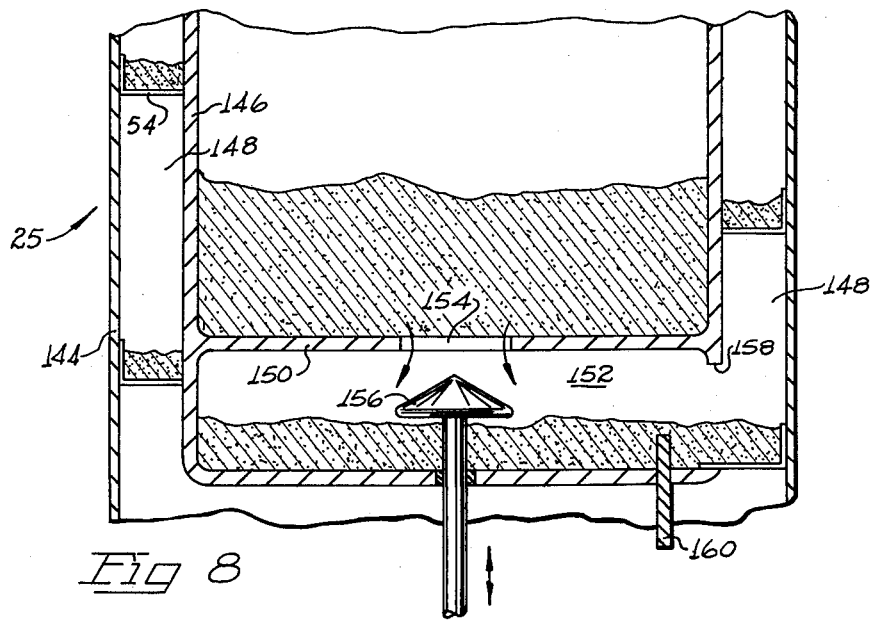
FIG. 8 is an elevational view in section of another embodiment of metering means for the dispenser of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to the drawings, it will be noted in FIG. 1 that our invention is illustrated by way of example as applied to a granular detergent or powdered soap storage and dispensing device used in association with a clothes washing machine having a housing 10. The washing machine may be of any desired type and may, for example, have a tub 12 provided with an agitator driven by a pulley 14 operably connected through a belt 16 and a pulley 18 with a driving motor 20 suitably positioned within the housing 10. A panel 22 associated with the housing 10 may be provided with suitable control knobs 24 by which a cycle of operation may be performed, for example, to wash, rinse and spin dry the clothes in the tub 12 in the known manner. It will, of course, be apparent that our invention is not limited in use with automatic washing machines because it is readily applicable to appliances embodying manual or automatic cycles, and to devices of all types but particularly to appliances of the household type for dispensing small quantities of granular detergent or other powdered materials.

The dispenser 25 consists of a cylindrical vessel 26 positioned, for example, within the housing 10 and having an outlet spout 28 positioned in discharging relation with respect to the tub 12. The vessel 26 is preferably mounted on a support 30 and is maintained in spaced relation with the upper surface of the support 30 by means of a plurality of supporting arms 32 hingedly mounted on the support 30 and hingedly connected to the vessel 26 at an angle of approximately 45°.

Motion transmitting means are employed to impart angular movement to the vessel 26 and the support arms 32 whereby the vessel 26 will be vibrated in such manner as to have both vertical and rotational components of movement. This movement relates to the conveyance of granular material within the vessel 26 and will be hereinafter more fully explained.

One desirable form of the motion transmitting means consists of a Bowden wire control mechanism 34 which extends through a cable 36. The cable 36 is secured at one end to an abutment 37 of the support 30 and at its other end to a clip 38 secured to the casing 39 also positioned in the housing 10.

As illustrated more clearly in FIG. 2, a shaft 40 is journaled in the casing 39 and positions a roller 42 in driven engagement with the outer face 44 of the driving belt 16. A driving cam 46 is fixed to the shaft 40 in spaced relation to the driven roller 42. The end 48 of the Bowden wire 34 bears against the surface of the cam 46 to impart reciprocating motion to the wire 34 as the cam 46 is rotated. A spring 50, concentrically mounted on the wire 34 and abutting against one end of the casing 39 engages a stop member 52 fixed to the wire 34 to yieldingly maintain the end 48 of the wire 34 in contact with the surface of the cam 46 as it is rotated by the belt 16. If desired, a series of cam members may be secured to the outer face 44 of the driving belt 16 and the shaft 40 may be mounted in a slot in the casing 39 to permit the driven roller to oscillate back and forth in the casing, the end 48 of the Bowden wire 34 engaging the surface of the driven roller 42.

A continuous granular or powder carrying ramp 54 is positioned in the chamber of the elongated vessel 26. The ramp 54, as illustrated, consists of a helical coil having vertically spaced convolutions 56. One edge of the helical ramp 54 is positioned against the inner wall of the vessel 26 to form a trough for the granular material. The ramp 54 may also be provided with an upwardly extending flange 55, as shown in FIG. 6, on the edge remote from the casing 26 to assist in containing the granular material.

In operation, vibration of the vessel 26 results in a corresponding vibration of the ramp 54. The vibration means thus act to sequentially move the ramp 54 in a diametrically upward and forward direction followed by a rapid stop and then diametrically downward and rearward movement whereby granular material carried by the ramp will be conveyed upwardly on the ramp towards the upper end of the vessel. The elevating principle is that of vibrating a slightly inclined plane so that it moves diagonally up and forward and then diagonally down and rearward in a somewhat steeper angle than its angle of incline. The granular material on the ramp 54 is thrown up and forward by its own inertia each time the plane moves upward and forward and then suddenly stops. As the plane moves downward and rearwardly, the granular material is left suspended in air and lands at a point higher on the plane than its original position. The granular material continues to move in this manner in successive upward steps towards the outlet spout 28 and is finally dispensed into the tub 12 of the washing machine.

Suitable automatic controls, correlated with the controls of the device being serviced, in this instance the washing machine, may be employed to introduce the dispensed material into the tub 12 at a desired phase in the cycle of operation of the washing machine. Where it is desired to operate the dispenser at a predetermined point of the cycle of operation, for example during an initial wash phase of the washing machine illustrated in FIG. 1, a clutching solenoid 58 shown in FIG. 2 may be electrically connected in the control circuit (not shown) programming the washing machine. De-energization of the solenoid 58 by means of the washing machine control circuit operates to move the plunger 60 in the direction of the arrow 57. The plunger 60, which is connected to the slidable casing 39 by means of a spring 59 attached to a projection 61, will draw the casing towards the belt 16 until the roller 42 engages the belt surface 44 whereupon the dispenser 25 will begin to vibrate. Energization of the solenoid 58 operates the plunger 60 in the reverse direction to disconnect the drive and stop the vibration of the dispenser 25.

One suitable control device for the metering of granular material from the dispenser is illustrated in FIGS. 3, 4, and 5. The mechanical counter metering system 62 thereshown has a housing 64 which may be conveniently mounted to the washing machine housing 10. The housing 64 comprises a vertical wall 66 having upper and lower mounting plates 68, 70 for pivotally mounting a vertically disposed screw 72 and a vertically disposed shaft 74. The shaft 74 carries a metering helix 76 which is resiliently mounted thereon by means of a spring 78.

Basically, the metering system 62 works as follows: the screw 72 is rotated by the vibration of the dispenser 25; a rider 94 is driven upwards by the rotation of the screw 72 until it strikes a point on the measuring helix 76 whereupon the rider 94 falls downwardly to strike and close a switch 106; closing of the switch 106, which is in the circuit of the clutching solenoid 58, operates to stop the dispenser 25 from vibrating and consequently discontinue the dispensing of granular material. The total amount of granular material dispensed is thus directly related to the time it takes the rider 94 to rise, strike the helix 76, and then fall to close the switch 106. The amount of material dispensed in one cycle may consequently be controlled by increasing or decreasing the time of the cycle which simply involves raising or lowering the point at which the rider 94 strikes the helix 76. This may be accomplished by rotating the helix 76 whereby points on the periphery of the helix 76 having continuously varying elevations will be moved to obstructing positions over the rider 94.

The helix 76 may be rotated to various metering positions by means of a knob 80 secured to the upper end of the shaft 74. When the helix 76 has been rotated to the desired metering position, it may be secured by means of a pin 82 carried by a block 84 on the upper end of the shaft 74. The pin 82 may be inserted into one of a flow into the passageway 148 is that above the gate 160. Therefore, as may be understood, the amount of granular material dispensed may be controlled by proper positionment of the gate 160.

Figure 9:
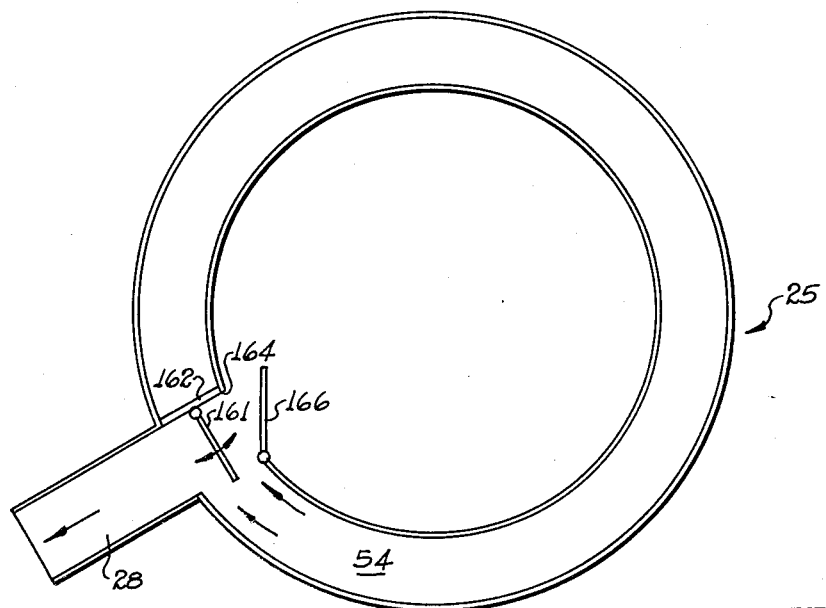
FIG. 9 is a top plan view of another embodiment of metering means for the dispenser of FIG. 1.

Another embodiment of the metering means is illustrated in FIG. 9 where a proportioning gate 161 is shown located at the uper end of the ramp 54 adjacent the outlet spout 28. The gate 161 is hingedly mounted on a wall 162 secured at the upper end of the ramp 54 to prevent passage of granular material thereby. The position of the gate 161 determines the amount of granular material which will flow into the spout 28 and the amount that will flow back into the vessel by means of a return opening 164 provided at the upper end of the ramp 54. The return opening 164 is also provided with a closure gate 166 to cooperate with the proportioning gate 161 to block the upper end of the ramp 54 when it is reloaded for a new metering charge. The proportioning device shown in FIG. 9 may be used in conjnction with a plurality of gates as shown in FIG. 6 or a metering chamber as shown in FIG. 8. By the method of FIG. 9, the amount of the metered material may be conveniently measured in any desired proportion from a single maximum charge down to a zero charge. The gates 161, 166 may be operated by means of a suitable manual selector knob (not shown) while the remaining metering gates used in conjunction with the metering means of FIG. 9 may be arranged to operate automatically at a predetermined point in cooperation with the dispensing and wash cycle of the associated washing machine.

Having thus described our invention, we claim:

1. A vibratory dispenser for storing, conveying and metering of granular material; said dispenser comprising a resiliently mounted vessel for storing granular material; an upwardly inclined ramp secured within the vessel to carry granular material stored therein; vibrating means to sequentially move the ramp in a diagonally upward and forward direction and a diagonally downward and rearward direction whereby granular material carried by the ramp will be conveyed upwardly on the ramp towards the upper end of the vessel; an outlet opening in the upper end of the vessel adjacent the upper end of the ramp to dispense granular material from the vessel; said vessel adapted to be partially filled with granular material whereby a portion of the ramp will extend above the level thereof; and metering means to control the amount of granular material dispensed; said metering means comprising at least one movable measuring gate positioned on the ramp above the level of the granular material adapted to block the upward conveyance of granular material thereby; a movable outlet closure gate positioned at the outlet opening adapted to block the outlet opening of the vessel; and means to sequentially move said gates into and out of their blocking positions; said means being operative to position at least one of the gates in blocking position at all times during the operation of the dispenser.

2. A vibratory dispenser for storing, conveying and metering of granular material; said dispenser comprising a resiliently mounted vessel for storing granular material; an upwardly inclined ramp secured within the vessel to carry granular material stored therein; vibrating means to sequentially move the ramp in a diagonally upward and forward direction and a diagonally downward and rearward direction whereby granular material carried by the ramp will be conveyed upwardly on the ramp towards the upper end of the vessel; an outlet opening in the upper end of the vessel adjacent the upper end of the ramp to dispense granular material from the vessel; said vessel adapted to be partially filled with granular material whereby a portion of the ramp will extend above the level thereof; and metering means to control the amount of granular material dispensed; said metering means comprising a plurality of spaced movable measuring gates positioned on the ramp above the level of the granular material adapted to block the upward conveyance of granular material thereby; a movable outlet closure gate positioned at the outlet opening adapted to block the outlet opening of the vessel; and means to sequentially move said gates into and out of their blocking positions; said means being operative to position at least one of the outlet and metering gates in blocking position at all times during the operation of the dispenser.

3. A vibratory dispenser for storing, conveying and metering granular material; said dispenser comprising a resiliently mounted vessel for storing granular material; an upwardly inclined ramp secured within the vessel to carry granular material stored therein; said ramp being a helical coil having one edge adjacent the inner wall of the vessel and having an upwardly extending peripheral flange on the other edge; vibrating means to sequentially move the ramp in a diametrically upward and forward direction and a diametrically downward and rearward direction whereby granular material carried by the ramp will be conveyed upwardly on the ramp towards the upper end of the vessel; an outlet opening in the upper end of the vessel adjacent the upper end of the ramp to dispense granular material from the vessel; said vessel being adapted to be partially filled with granular material whereby a portion of the ramp will extend above the level thereof; and metering means to control the amount of granular material dispensed; said metering means comprising at least one swingable measuring gate positioned on the ramp above the level of the granular material adapted to block the upward conveyance of granular material thereby; a swingable outlet closure gate positioned at the outlet opening adapted to block the outlet opening of the vessel; and means to sequentially move said gates into and out of their blocking positions; said means being operative to position at least one of the gates in blocking position at all times during the operation of the dispenser.

4. A vibratory dispenser; said dispenser comprising a body having an upwardly inclined ramp terminating in an outlet opening in the body for the conveyance of granular material; metering means comprising at least one movable measuring gate positioned on the ramp adapted to block the upward conveyance of granular material thereby; a movable outlet closure gate positioned at the outlet opening adapted to block the flow of granular material through the outlet opening; and means to sequentially move said gates into and out of their blocking positions; said means being operative to position at least one of the gates in blocking position at all times during the operation of the dispenser.

5. A vibratory dispenser; said dispenser comprising a body having an upwardly inclined ramp terminating in an outlet opening in the body for the conveyance of granular material; metering means comprising a plurality of spaced movable measuring gates positioned on the ramp adapted to block the upward conveyance of granular material thereby; a movable outlet closure gate positioned at the outlet opening adapted to block the flow of granular material through the outlet opening; and means to sequentially move said gates into and out of their blocking positions; said means being operative to position at least one of the outlet and metering gates in blocking position at all times during the operation of the dispenser.

6. A vibratory dispenser; said dispenser comprising a body having an upwardly inclined ramp for the conveyance of granular material terminating in an outlet opening in the body and a return opening in the ramp leading back into the dispenser; metering means comprising at least one movable measuring gate positioned on the ramp adapted to block the upward conveyance of granular material thereby; a proportioning gate pivotally mounted at the upper end of the ramp to swing transversely of the ramp and adapted to direct a portion of the granular material through the return opening and a portion through the outlet opening; and a movable outlet closure gate positioned at the return opening adapted to block the return opening of the dispenser; and means plurality of openings 86 provided in the mounting plate 68 for engagement therewith. As may be readily understood, the helix 76 may be rotated simply by depressing the knob 80, turning the helix to the desired point, and then releasing the knob 80 whereby the spring 78 will urge the pin 82 into one of the openings 86.

The rider 94 comprises a generally rectangular block 95 having a smooth-sided vertical opening 97 receivable on the screw 72 and of somewhat larger diameter than the screw 72 in order that it will fall freely during its descent. A horizontally disposed opening 99 is provided in the block 95 to carry a slidable end-threaded pin 96 which projects into threading engagement with the screw 72 during upward travel of the rider 94. A slidable rider release plunger 98 is also provided in the block 95. The plunger 98 is frictionally engaged in a vertically disposed opening 101 provided in open communication with the horizontal opening 99 whereby the plunger 98 abuts against the pin 96.

The rider 94 is secured against rotation by an inturned flange 103 of the housing 64 which extends into a vertical guide notch 105 provided in the block 95. Accordingly, when the pin 96 threadingly engages the screw 72, rotation of the screw 72 will carry the rider 94 upward. The screw 72 is rotated by means of a ratchet 88 fixedly mounted on its upper end and driven by a ratcheting pawl 90 attached to the dispenser 25 and held by a holding pawl 92 secured to the housing 64. In operation, vibration of the dispenser 25 causes the ratcheting pawl 90 to vibrate back and forth thus rotating the ratchet 88 and screw 72.

Upward movement of the rider 94 caused by the rotating screw 72 will eventually carry the uppermost point of the rider release plunger 98 into contact with a point on the periphery of the helix 76. The plunger 98 is frictionally mounted in the block 95 to the end that when it contacts the helix 76 it will slide downward in the rider 94. The rider 94 will continue to rise after the plunger 98 strikes the helix 76 until the slidable end-threaded pin 96 reaches a notch 100 provided in the side of the plunger 98. The pin 96 is then thrown into the notch 100 and out of engagement with the screw 72 as a result of the centrifugal force of the rotating screw 72.

At this point, the rider 94 will fall, carrying the plunger 98 downward, through an opening 102 in the lower mounting plate 70 to strike and actuate a lever 104 of the switch 106. Actuation of the lever 104 serves to close the normally open switch 106, energizing the clutching solenoid 58 and causing the vibration of the dispenser 25 to cease. This will, of course, cause the dispenser 25 to discontinue dispensing granular material.

When the plunger 98 reaches the end of its downward travel, the block 95 will continue to fall until it strikes the lower mounting plate 70, forcing the pin 96 out of the notch 100 and into re-engagement with the screw 72. The plunger 98 will also be returned to its original position as a result of bouncing upwards due to the spring action of the lever 104. The dispenser 25 may be started again by depressing the knob 80 whereby the lower end of the shaft 74 will contact the lever arm 104 to open the switch 106. The rider mechanism 94 will then begin its upward travel upon operation of the appliance motor 20 and the cycle will be repeated.

A second embodiment of suitable metering means is illustrated in FIG. 6. As there shown, a plurality of swingable gates 108, 110, 112 are positioned on the ramp 54 transversely thereof in blocking positions. The gates 108, 110, 112 operate to meter the load of granular material flowing from the dispenser 25, the amount of material upstream from each gate being the metered charge. The gates are located above the uppermost level of the granular material in the vessel 26 so that the ramp 54 cannot be charged above the gates. A swingable outlet closure gate 114 is positioned transversely of the outlet spout 28 to block the outlet opening of the vessel. In operation, the outlet gate 114 is open and at least one of the gates 108, 110, 112 is closed. All of the granular material upstream of the closed gate is dispensed from the dispenser 25. When the metered amount has been dispensed, the outlet gate 114 is closed and the closed gate 108, 110, 112 is opened in order to re-charge the ramp 54 in front of the metering gates.

The opening and closing of the gates may be accomplished by means of a solenoid operated device 116 as shown in FIG. 7. The device 116 includes a plate 118 having a plurality of elongated slots 120, 122, 124 to receive the operating handles 126, 128, 130 of the metering gates. The plate 118 is slidably carried in a framework 134 which itself is mounted for vertical movement in slides 136, 138 secured to the dispenser 25. A solenoid 132, mounted on the dispenser 25, is provided with its plunger 133 attached to the framework 134 to move the framework 134 and plate 118 in vertical directions. In operation, vertical movement of the plate 118 results in a camming action on the operating handles 126, 128, 130 to swing the gates 108, 110, 112 a quarter turn about their axes.

The arrangement of the slots 120, 122, 124 is such that at one end of the solenoid stroke two of the gates 108, 110, 112 are in open position, while the third gate is in closed position and at the opposite end of the solenoid stroke, all three gates are in open position. This is accomplished, as may be seen in FIG. 7, by providing each slot with upper segments 121 equaling about two-thirds of the length of the slot, and a lower segment 123 equaling about one-third of the length of the slot. The segments 121, 123 are arranged in cooperating relationship in three columns each column comprising a lower segment 123 and two upper segments 121. When a gate handle 126, 128, 130 is positioned in a lower segment 123, it will be closed at one end of the solenoid stroke and swing one-quarter turn to an open position at the other end of the stroke; the remaining two of the three handles 126, 128, 130, being positioned in upper segments 121, will swing from one-quarter to one-half turn positions, thus always being open.

The selection of the normally closed gate may be made by sliding the plate 118 along the slides 135, 137 until the desired gate positioned is reached.

A projecting arm 140 having an outwardly extending tab 139 extends through a vertical slot in the slide 138 towards the closure gate 114. The operating arm 142 of the gate 114 projects through a slot 141 in the tab 139 to open and close in the reverse order of the normally closed gates 108, 110, 112; that is, when the normally closed metering gates 110, 112, 108 are open, the outlet gate 114 is closed, and when the metering gates are closed the outlet gate 114 is open. In this manner, the desired amount of granular material may be metered, in, for example one-half cup increments.

FIG. 8 illustrates another embodiment of a suitable metering device. As there shown, the dispenser 25 comprises an outer vessel 144 and an inner storage vessel 146 spaced therefrom to form an annular passageway 148 in which is mounted the ramp 54. A bottom wall 150 extends across the lower end of the vessel 146 to form a metering chamber 152. An opening 154 is provided in the bottom wall 150 for communication between the storage and metering chambers. A mushroom-shaped metering gate 156 is provided to move vertically to open and close the opening 154. The gate 156 may be operated manually or by means of a solenoid if desired. The gate 156 is normally open and is adapted to be closed when the dispenser 25 is in operation. An outlet opening 158 is provided from the metering chamber 152 to the passageway 148 whereby granular material can flow onto the ramp 54. The amount of the granular material flowing onto the ramp 54 is controlled by a vertically slidable gate 160. The only granular material which may to sequentially move said measuring gates and outlet gates into and out of their blocking positions; said means being operative to position at least one of said gates in blocking position at all times during the operation of the dispenser.

References Cited in the file of this patent

UNITED STATES PATENTS

| | | |
|---|---|---|
| 2,760,504 | Spurlin | Aug. 28, 1956 |
| 2,769,574 | Algiers et al. | Nov. 6, 1956 |
| 2,816,427 | Vela | Dec. 17, 1957 |
| 2,818,968 | Carrier | Jan. 7, 1958 |
| 2,830,142 | Smith | Apr. 8, 1958 |
| 2,855,476 | Garrard | Oct. 7, 1958 |
| 2,857,938 | Wahl | Oct. 28, 1958 |
| 2,881,951 | Duchi | Apr. 14, 1959 |
| 2,921,713 | Zanotto et al. | Jan. 19, 1960 |

FOREIGN PATENTS

| | | |
|---|---|---|
| 767,430 | France | May 1, 1934 |